UNITED STATES PATENT OFFICE.

HERMANN ENDEMANN, OF BROOKLYN, ASSIGNOR TO THE AMERICAN CARBONATE COMPANY, OF NEW YORK, N. Y.

COMPOSITION OF MATTER FOR ARTIFICIAL STONE.

SPECIFICATION forming part of Letters Patent No. 489,377, dated January 3, 1893.

Application filed March 31, 1892. Serial No. 427,290. (No specimens.)

*To all whom it may concern:*

Be it known that I, HERMANN ENDEMANN, a citizen of the United States, residing at Brooklyn, in the county of Kings and State of New York, have invented new and useful Improvements in a Composition of Matter for Artificial Stone, of which the following is a specification.

This invention relates to a composition of matter for artificial stone which consists of magnesia, magnesia hydrate and basic oxalate of magnesia.

In carrying out my invention, I take magnesia which may be produced from magnesite by burning or otherwise and mix it with a cold concentrated solution of acid oxalate of ammonia to the consistency of a mortar and from this mixture ornamental or other stones are formed and allowed to harden. During the process of hardening, the ammonia is expelled and the mass sets to a uniform mixture of magnesia, magnesia hydrate and basic oxalate of magnesia and I have found that during the process of setting the mass is neither disintegrated nor traversed by fissures or cracks.

A ten percent. solution of neutral ammonium oxalate may be used in place of the acid ammonium oxalate above mentioned. I have also used oxalic acid in ten percent. solution and in fact the mixture from which I produce my artificial stone contains, magnesia about three hundred parts (by weight). Oxalic acid about fifteen parts. Water about one hundred and eighty-five parts. During the process of setting a portion of the water evaporates and a uniform mixture of magnesia, magnesia hydrate and basic oxalate of magnesia is obtained which forms my new composition.

If desired other substances may be added to the above named mixture, such for instance, as ground quartz or sand and in that case a larger quantity of oxalate of ammonium must be used, for instance good results are obtained by using, magnesia sixty parts. Quartz ground fine sixty parts. Sand one hundred and eighty parts. Solution of ammonium oxalate fifty-four parts. Or the following: Magnesia sixty parts. Quartz ground fine sixty parts. Sand one hundred and eighty parts. Silica precipitated from liquid glass ten parts. Solution of ammonium oxalate seventy parts. Or the following mixture may be used for an imitation of terra cotta: Magnesia one hundred parts. Ground quartz two hundred parts. Oxide of iron fifty parts. Solution of ammonium oxalate one hundred and seventy parts. If desired any suitable coloring matter may be added.

For many purposes the stones thus attained may not be hard enough. In such cases they undergo a process of hardening, which consists either in simply placing them into water at ordinary or an elevated temperature whereby more hydrate is formed or into a solution of an oxalate. Of such oxalates I can use oxalate of iron and ammonia or oxalate of ammonia and for uncolored stones I use by preference oxalate of alumina in dilute water solution. Thereby the magnesia unites with an additional quantity of oxalic acid, while also alumina is deposited in the mass. By this treatment the stones increase not only in hardness, but their porosity is essentially diminished and their resistance to the influence of the atmosphere increased.

What I claim as new and desire to secure by Letters Patent is—

1. A composition of matter for artificial stone, consisting of magnesia, magnesia hydrate, and basic oxalate of magnesia, substantially as described.

2. A composition of matter for artificial stone, consisting of magnesia, magnesia hydrate, basic oxalate of magnesia, and sand, substantially as described.

3. The process of preparing artificial stones which consists in mixing together magnesia, oxalic acid and water in about the proportion above specified, allowing the mass to harden and then exposing the same to the action of an oxalate, substantially as described.

In testimony whereof I have hereunto set my hand in the presence of two subscribing witnesses.

HERMANN ENDEMANN.

Witnesses:
 WM. C. HAUFF,
 E. F. KASTENHUBER.